US012442217B2

(12) United States Patent
Meier et al.

(10) Patent No.: US 12,442,217 B2

(45) Date of Patent: Oct. 14, 2025

(54) ELECTRONIC MONITORING OF THE LOCKING STATUS OF A UTILITY LOCKING SYSTEM

(71) Applicant: dormakaba Schweiz AG, Wetzikon (CH)

(72) Inventors: Tom Meier, Wetzikon (CH); Stephan Hanselmann, Wetzikon (CH); Stefan Schwendeler, Wetzikon (CH); Martin Buholzer, Wetzikon (CH)

(73) Assignee: DORMAKABA SCHWEIZ AG, Wetzikon (CH)

( * ) Notice: Subject to any disclaimer, the term of this patent is extended or adjusted under 35 U.S.C. 154(b) by 164 days.

(21) Appl. No.: 18/345,496

(22) Filed: Jun. 30, 2023

(65) Prior Publication Data

US 2024/0011324 A1 Jan. 11, 2024

(30) Foreign Application Priority Data

Jul. 5, 2022 (EP) .................................... 22183040

(51) Int. Cl.
*E05B 39/04* (2006.01)
*H04W 4/12* (2009.01)

(52) U.S. Cl.
CPC ............... *E05B 39/04* (2013.01); *H04W 4/12* (2013.01)

(58) Field of Classification Search
CPC .......... E05B 39/00; E05B 39/04; H04W 4/00; H04W 4/12; G07C 9/00; G07C 9/00309; G07C 9/00944; G07C 2209/64
USPC ........................................................... 70/437
See application file for complete search history.

(56) References Cited

U.S. PATENT DOCUMENTS

| | | | | | |
|---|---|---|---|---|---|
| 5,471,668 | A * | 11/1995 | Soenen | G07C 9/00817 455/352 |
| 5,832,377 | A * | 11/1998 | Soenen | G07C 9/00817 455/352 |
| 6,046,680 | A * | 4/2000 | Soenen | G08C 19/28 340/5.31 |
| 10,388,094 | B2 * | 8/2019 | Johnson | E05B 47/0012 |
| 10,846,957 | B2 * | 11/2020 | Cheng | G07C 9/00309 |
| 10,970,983 | B2 * | 4/2021 | Johnson | H04L 12/282 |
| 10,993,111 | B2 * | 4/2021 | Johnson | H04W 4/023 |
| 11,043,055 | B2 * | 6/2021 | Johnson | H04N 7/186 |
| 11,352,812 | B2 * | 6/2022 | Johnson | G07C 9/00904 |

(Continued)

*Primary Examiner* — Nathan Cumar

(74) *Attorney, Agent, or Firm* — CANTOR COLBURN LLP

(57) ABSTRACT

A method for outputting a notification about the existence of a status of a locking system that is to be avoided, with the locking system having an electronic knob and a locking device which may be actuated with the electronic knob, with a force being transmitted from the electronic knob to the locking device in order to transfer the locking system from a bolted to an unbolted status and/or from an unbolted status to a bolted status. The method includes:

detecting an actual status of the locking system, determining a target status of the locking system depending on predefined criteria, comparing the actual status with the target status of the locking system and determining whether there is a discrepancy between the actual status and target status of the locking system, and outputting at least one notification if there is a discrepancy between the actual status and target status.

15 Claims, 5 Drawing Sheets

(56) References Cited

U.S. PATENT DOCUMENTS

| | | | | |
|---|---|---|---|---|
| 11,421,445 | B2 * | 8/2022 | Johnson | E05B 47/0012 |
| 11,527,121 | B2 * | 12/2022 | Johnson | G07C 9/00571 |
| 11,802,422 | B2 * | 10/2023 | Johnson | E05B 63/0065 |
| 11,961,344 | B2 * | 4/2024 | Kincaid | G07C 9/00309 |
| 2015/0109097 | A1 * | 4/2015 | Kogler | G07C 9/29 340/5.2 |
| 2016/0189453 | A1 * | 6/2016 | Johnson | H04W 4/023 340/5.61 |
| 2016/0232729 | A1 * | 8/2016 | Engel-Dahan | G07C 9/00912 |
| 2018/0040182 | A1 * | 2/2018 | Malhotra | H04W 12/084 |
| 2019/0206168 | A1 * | 7/2019 | Reime | G07C 9/00722 |
| 2020/0098213 | A1 * | 3/2020 | Tartal | E05B 47/0012 |
| 2020/0329136 | A1 * | 10/2020 | Gerhardt | H04L 63/0492 |
| 2020/0364960 | A1 * | 11/2020 | Leask | G07C 9/00896 |

* cited by examiner

ELECTRONIC MONITORING OF THE LOCKING STATUS OF A UTILITY LOCKING SYSTEM

CROSS-REFERENCE TO RELATED APPLICATIONS

This application claims the benefit of European patent application 22183040.9 filed 5 Jul. 2022, the disclosure of which is incorporated herein by reference in its entirety.

TECHNICAL FIELD

The disclosure relates to a method for outputting a notification about the existence of a status of a utility locking system that is to be avoided, an electronic knob as part of a utility locking system, a utility locking environment and a computer program for carrying out the method.

BACKGROUND

Numerous different locking systems, which can be actuated mechanically or electronically, are known from the state of the art. An example of an electronic lock is the so-called smart lock. It can be bolted and unbolted by interacting with an authorized device. In such an interaction, for example, encrypted data that enables the authorized device to be identified can be transmitted from the authorized device to the electromechanical lock via a wireless transmission protocol. Smart locks are used in particular in the area of access control for buildings and rooms (e.g. for craftsmen, domestic help, tenants of holiday apartments). Essential features of such smart locks are that they actuate the lock independently without a user having to manually insert a key into the lock or actuate it manually, and that the locking status can be monitored.

In the area of utility services, i.e. for utility companies that carry out the maintenance and operation of infrastructure objects (e.g. electrical boxes, water supply points, gas pressure control systems, signal boxes on railway tracks), a high degree of reliability and security of the locking systems—hereinafter referred to as utility locking systems—is important, while at the same time the energy requirement must be kept low. For this reason, purely mechanical keys and locking devices are still traditionally used in this area. This is why problems often occur, in particular with utility locking systems. For example, it can happen that the service personnel, who carry out maintenance on an infrastructure object, forget to bolt the utility locking system again.

SUMMARY

The disclosure provides an improved method for operating a utility locking system, in particular an electromechanical utility locking system, which is improved from the point of view of security.

This is achieved by the subject matters of the independent claims. Advantageous further developments of the disclosure are indicated in the dependent claims, the description and in the figures. Features and details that are described in connection with the method according to the disclosure also apply in connection with the device according to the disclosure and/or the use according to the disclosure and vice versa.

According to the disclosure, a method is provided for outputting a notification about the existence of a status of a utility locking system to be avoided, with the utility locking system comprising an electronic knob and a locking device which can be actuated with the electronic knob, and a force may be transmittable or is transmitted manually from the electronic knob to the locking device in order to transfer the utility locking system from a bolted to an unbolted status and/or from an unbolted status to a bolted status, having the steps:

- Detecting an actual status of the utility locking system,
- Determining a target status of the utility locking system depending on predefined criteria,
- Comparing the actual status with the target status of the utility locking system and determining whether there is a discrepancy between the actual status and the target status of the utility locking system,
- Outputting at least one notification if there is a discrepancy between the actual status and the target status of the utility locking system.

Provision is preferably made for the electronic knob to be electrically and/or mechanically coupled, in particular connected, to the locking device. Furthermore, the electronic knob can be designed to be detachable from the locking device electrically and/or mechanically in a non-destructive manner.

Provision can also be made for the electronic knob and a mobile terminal to be configured to communicate with one another wirelessly and to transmit at least access authorizations and/or opening commands and/or position data.

In particular, the method is suitable for use on a building and/or on an access solution for a room in which equipment and/or devices to be maintained or checked are installed, which are also to be checked or inspected in compliance with certain time periods, which may be predefined as standard. The term utility locking system is to be understood insofar as it is a locking system which enables entry or access to a utility infrastructure object. The disclosure is thus designed for the utility services sector, i.e. for utility companies that carry out the maintenance and operation of infrastructure objects (e.g. electrical boxes, water supply points, gas pressure control systems, signal boxes on railway tracks). The disclosure ensures a high degree of reliability and security of the locking systems, in particular in the area of utility services.

In particular, the locking device can be designed as a locking cylinder for a door, in particular a building door, a room door and/or for a furniture door, without the exemplary naming of such locking cylinders being intended to be restrictive.

In particular, it is conceivable that the “status to be avoided” is present when there is a discrepancy between the actual status and the target status of the locking system. The status to be avoided is thus to be understood in particular as an undesired status that is caused, for example, by mistake and requires action.

A sensor device can be arranged in the utility locking system, in particular in the electronic knob, to detect an actual status of the utility locking system. The predefined criteria for determining a target status can be provided in particular in a non-volatile memory of the electronic knob. A target status can be determined in particular by means of a computing unit of the utility locking system or the electronic knob.

Alternatively or additionally, the predefined criteria can be provided in a mobile terminal, which is configured to communicate with the utility locking system or the electronic knob, with the actual status being sent from the utility locking system or the electronic knob to the mobile terminal. A target status can thereby be determined on the mobile terminal.

It is conceivable for the electronic knob to be configured using the mobile terminal, in particular via the wireless connection. It is conceivable, for example, that the wireless communication connection between the mobile terminal and the electronic knob is established using Bluetooth, with Bluetooth pairing in particular being carried out. Alternatively, however, other wireless communication connections, such as ultra-wideband (UWB), between the mobile terminal and the electronic knob are also possible. The wireless communication connection can in particular be designed as a near-field communication connection.

According to one embodiment of the present disclosure, it is conceivable that locking system information, in particular relating to the utility locking system, can be provided by the electronic knob and in particular can be received by the mobile terminal. The locking system information can in particular be a unique identifier (UID) which makes the locking system uniquely identifiable. In particular, the locking system information can be relayed from the mobile terminal to a server system in order to carry out a comparison with a digital representation of the utility locking system in the server system. Based on this, a configuration data packet can be provided by the server system and sent to the mobile terminal. The configuration data packet is preferably part of the digital representation. In other words, the UID of the utility locking system can be used to perform an associated intended configuration of the utility locking system.

The mobile terminal can be configured to relay the configuration data packet for the respective utility locking system to the electronic knob of the utility locking system in order to configure the utility locking system as predefined in particular by the digital representation. In particular, any suitable wireless communication technology can be used for the communication between the mobile terminal and the electronic knob, for example Bluetooth, Zigbee, UWB.

The configuration data packet can in particular comprise times of day and/or times at which access can be enabled. Alternatively or additionally, the configuration data packet can comprise a blacklist or a blacklist update, which configures the utility locking system such that access is denied to specific mobile terminals.

Provision can also be made for the mobile terminal to be authorized to unbolt the utility locking system by communicating with the server. It is conceivable to configure the mobile terminal with key information for unbolting a group of utility locking systems. The group of utility locking systems can include, for example, all locking devices of buildings, rooms and/or devices to be checked, which a technician shuts down and/or checks at a time interval, for example on a day. In particular, the authorization can be granted for a limited period of time.

It is preferably provided that the force that is transmitted from the electronic knob to the locking device in order to transfer the utility locking system from a bolted to an unbolted status and/or from an unbolted status to a bolted status is accompanied by a translatory and/or rotary movement of the electronic knob relative to the locking device carried out manually by a user, with the force in particular being a torque.

The manually mechanically actuatable design of the utility locking system makes it possible to save energy that would be required with an electromechanical opening. Any energy storage device of the utility locking system only requires energy for communication with the mobile terminal and, depending on the implementation, a particularly energy-saving communication technology can be used. It can optionally be provided that the knob must first be touched or actuated slightly in order to activate the communication interface for communication with the mobile terminal. The actual actuation for unbolting can then take place. In this way, the energy requirements of the utility locking system can be further reduced.

The manual mechanical actuation can be, for example, pushing in the electronic knob or turning the electronic knob. A combination of pressing and turning or turning and pressing is also conceivable.

It is therefore preferred that the unbolting of the utility locking system comprises both a mechanical actuation of the electronic knob, in particular exerting or transmitting a torque, and information-technology communication between the utility locking system or the electronic knob and the mobile terminal, which in particular can be configured to unbolt the locking device.

It is preferably conceivable that an electrical energy storage device of the mobile terminal takes over the supply of energy to the utility locking system. A wireless charging technology can be used for this purpose, for example. Wireless charging technologies are known from the state of the art and are based in particular on induction. Electrical energy can therefore be provided wirelessly, in particular via inductive energy transmission. It is therefore conceivable that the utility locking system locking device does not have its own electrical power supply.

It can be particularly preferred if, when the at least one notification is output, a, in particular first, notification is output on the electronic knob, and the, in particular first, notification can in particular be an acoustic and/or haptic and/or visual notification. This measure is particularly advantageous with regard to the simple handling of the system, in particular with regard to the ability to check the status of the relevant locking device.

In particular, visual display elements can be arranged on the electronic knob. These can be designed, for example, as small LED lights on the electronic knob, with the visualization of the, in particular first, notification being able to be effected particularly easily and reliably. Of course, the, in particular first, notification can also be generated by a text, an image, a tone (or a plurality of tones, including a melody) and/or by vibration on the electronic knob. The necessary devices have to be implemented for this. These measures significantly support the above advantages.

It can be particularly preferred if, when the at least one notification is output, a, in particular second, notification is output on a mobile terminal, with the mobile terminal being designed and configured to communicate with the utility locking system or the electronic knob, with the, in particular second, notification that is output on the mobile terminal being in particular an acoustic and/or haptic and/or visual notification.

The output of a notification on the mobile terminal is particularly advantageous since the necessary devices for a notification on mobile terminals generally already exist, for example a vibration motor. Furthermore, the output of the, in particular second, notification on the mobile terminal can be designed in a user-friendly manner due to the wide range of display options and can be adapted to a user's preferences. For example, the user can specify the type of notification according to their preferences.

If a notification is provided on the electronic knob and the mobile terminal, i.e. a first and a second notification is provided, the probability that a user will notice the notification is also increased. The user is also given the opportunity to check the notifications for consistency. It goes without saying that it is also within the meaning of the disclosure that only the in particular first or the in particular second notification is observed by the user.

The in particular second notification can be, for example, an acoustic notification with the simultaneous generation of a text. A further security aspect is thus fulfilled, since the, in particular second, notification can be generated in a way that is particularly easily and reliably noticeable. Furthermore, through the use of text, the notification can be enriched with additional information, so that the user can immediately recognize which undesired status is present.

It can be particularly preferred that the actual status of the utility locking system comprises a locking status of the locking device, with the locking status being an unbolted or a bolted locking status.

In particular, it may be that the target status of the utility locking system can comprise a locking status of the locking device, with the locking status being an unbolted or a bolted locking status. The unbolted locking status is present, for example, when a corresponding door is unbolted. The bolted locking status is present, for example, when the corresponding door is bolted.

It is therefore conceivable according to one embodiment of the present disclosure that the determination of a target status of the utility locking system depending on predefined criteria includes determining and/or defining an intended locking status of the locking device, in particular in such manner that it is determined and/or defined whether the locking device should be in an unbolted or a bolted locking status.

For example, the target status can correspond to the bolted locking status and the actual status can correspond to the unbolted locking status.

It can be determined in a simple manner which target status should include which conditions. A rule is conceivable, for example, which provides a specific locking status of the locking device at a specific time as the target status. Additionally or alternatively, a rule is conceivable in which the target status comprises a distance between the mobile terminal and the utility locking system. Additionally or alternatively, a rule is possible in which the target status comprises a user status, e.g. a type of movement of a user. For example, a message is output if the unbolted locking status is present at 10 pm and the mobile terminal is at least 1 km away from the utility locking system and/or the user is driving a car.

It is conceivable that the determination and/or definition of the intended locking status takes place depending on one or more of the following predefined criteria:

- Defining by a user and/or operator of the locking device, whether the locking device should be in an unbolted or bolted status;
- Defining whether the locking device should be in an unbolted or bolted status depending on a type of building on which the locking device is located;
- Defining on the basis of a, preferably selectable, security criterion, whether the locking device should be in an unbolted or bolted status;
- Defining a maximum period of time after unbolting the locking device, after which the locking device should be in a bolted status again;
- Defining one or more time periods in which the locking device should always be in a bolted or always in an unbolted status.

It is conceivable, for example, that it can be defined that the locking device should always be in an unbolted or always in a bolted locking status in one or more time periods. For example, it would be conceivable that the locking device should always be in a bolted status after a specific time. In this way, security requirements for the locking device can advantageously be taken into account. The target status can preferably be determined individually for each locking device, in particular it can be identified and/or defined.

It can be particularly preferred if the locking status of the locking device or the utility locking system is determined by means of data of at least one sensor arranged in the electronic knob, with the at least one sensor being selected in particular from the following sensor types: Acceleration sensor, gyroscope, pressure sensor.

In this way it can always be ensured that the respective locking status can be generated in its actual status at any time. In other words, it is possible to monitor the locking status in real time. It is conceivable, for example, that data of the acceleration sensor, gyroscope and/or pressure sensor can be used to determine:

- whether the electronic knob has been manually moved to a position in which the electronic knob unbolts the locking device, and/or
- whether the electronic knob has left the position in which the locking device is unbolted and/or
- whether the electronic knob was actuated, for example rotated, in such manner that the rotation caused a change in the locking status.

The use of an acceleration sensor is advantageous with regard to its particularly low power consumption, but also with regard to its inexpensive procurement. The use of a gyroscope is advantageous with regard to its high accuracy. The use of pressure sensors is advantageous with regard to the particularly simple derivation of the locking status and the simple structural design.

Provision can be made for the locking device to comprise at least one blocking element which, in a blocking position, prevents rotation of a locking core relative to a locking device housing and, in an unblocking position, enables rotation of the locking core in the locking device housing.

It can be particularly preferred if the actual status of the locking system comprises a determined characteristic value which is derived from signal characteristic values of wireless communication between the electronic knob and the mobile terminal, with the mobile terminal being designed and configured to communicate wirelessly with the electronic knob, and with the target status comprising a threshold characteristic value.

Various wireless communication technologies can be used for the wireless communication between the electronic knob and the mobile terminal. It is conceivable, for example, that the wireless communication between the electronic knob and the mobile terminal takes place using Bluetooth, near-field communication (NFC), WLAN, in particular Wi-Fi direct, ZigBee, ultra-wideband (UWB) and/or Device-to-Device (D2D) communication. The signal characteristic values of the wireless communication between the electronic knob and the mobile terminal can preferably comprise signal strength characteristic values, particularly preferably RSSI (received signal strength indicator) values. Alternatively or additionally, for example, signal characteristic values, such as time-of-flight and/or angle-of-arrival, can be included in order to detect a relative movement between the electronic knob and the mobile terminal. This is possible, for example, when using ultra-wideband communication between the electronic knob and the mobile terminal.

In particular, the threshold characteristic value can be defined by the minimum requirements for signal characteristic values of wireless communication such that data can still be exchanged between the electronic knob and the mobile terminal, i.e. wireless communication is still guaranteed. In other words: Communication between the electronic knob and the mobile terminal is only possible as long as there is a connection between the electronic knob and the mobile terminal. For example, from a certain distance, which is defined by the communication technology used, communication between the electronic knob and the mobile terminal is no longer possible. In this case, the mobile terminal stores information from the last communication that took place between the electronic knob and the mobile terminal, for example the location data of the mobile terminal.

The threshold characteristic value being undercut can be an undesired status or a deviation of the actual status from a target status, which triggers the output of the at least one notification.

A possible imminent loss of connection between the electronic knob and the mobile terminal can be detected by means of signal characteristic values, in particular by means of signal strength characteristic values, in particular RSSI values. This can occur, for example, due to an increasing distance between the mobile terminal and the electronic knob, with the signal strength decreasing as the distance increases. This can also be caused by resistances, e.g. concrete walls or similar acting as shielding.

In order in particular to prevent forgetting to close the corresponding infrastructure object, if a signal strength threshold value is undercut, a notification can be output on the mobile terminal and/or the electronic knob if the utility locking system is still in the unbolted status.

The notification particularly preferably takes place shortly before a possible loss of connection between the electronic knob and the mobile terminal. Alternatively or additionally, the notification can also take place when or after a connection is lost.

A notification can thus be triggered in particular if, using a comparison of the determined characteristic value, in particular the signal characteristic value, and the threshold characteristic value, in particular the signal strength threshold value, it is determined that the mobile terminal is moving away from the electronic knob and the utility locking system is not yet bolted. This saves a user having to return to the corresponding infrastructure object after having traveled long distances, for example by car, in order to bolt the utility locking system. The notification can thus be used as an early warning system.

It can be particularly preferred if the determined signal characteristic value is a signal strength characteristic value and the threshold characteristic value is a signal strength threshold value. Compared to a pure distance measurement, the use of signal characteristic values makes it possible to provide a particularly robust notification system, since even short distances can be problematic with thick walls, for example, and can cause losses of connection.

Alternatively or additionally, it can nevertheless be provided that the actual status of the utility locking system comprises a determined physical distance between the electronic knob and a mobile terminal, with the target status comprising a distance threshold value between the electronic knob and the mobile terminal. The actual value deviates from the target value in particular when the distance exceeds the distance threshold value.

Location data/GPS data can be used to determine the spatial distance, with a GPS module being able to be arranged in the mobile terminal and/or in the electronic knob. The mobile terminal has a GPS module as standard, such that the distance between the electronic knob and the mobile terminal can be easily calculated without the need for a GPS module in the electronic knob. As an alternative to using GPS data, communication via ultra-wideband (UWB) or Bluetooth Low Energy (BLE) can be provided to determine the distance between the electronic knob and the mobile terminal, as described above. In this case, however, it is only possible to determine the distance as long as there is a connection between the electronic knob and the mobile terminal.

It may be particularly preferred that the actual status of the locking system comprises a user status of a user of the mobile terminal, with the user status being detected on the basis of acceleration data and/or speed data and/or temperature data, with the acceleration data and/or speed data and/or temperature data being recorded by means of sensors of the mobile terminal. The sensors are in particular acceleration sensors and/or speed sensors and/or temperature sensors.

In an expedient embodiment, acceleration data and/or speed data of the mobile terminal are preferably used. On the basis of the movements performed by the user, this can determine the user status in which the user is located; for example, the user status can include activities such as walking, standing, sitting, etc.

It is conceivable that the actual status of the locking system is determined using acceleration data and/or speed data and/or temperature data from one or a plurality of sensors of the mobile terminal. Acceleration data and/or speed data of the mobile terminal can be used, for example, to determine that the mobile terminal is in a vehicle, in particular when the acceleration data and/or speed data are characteristic features of the acceleration and/or speed development of a vehicle while driving.

If a connection between the mobile terminal and the electronic knob is lost or is only very weak, it can be concluded that the user is moving away from the utility locking system. If, at the same time, the locking device is in the unbolted locking status, a notification can be output. Using temperature data from one or a plurality of sensors of the mobile terminal, it can be determined, for example, whether the mobile terminal is carried in a pocket of a user's clothing or on a user's body, or whether it is located inside a building or vehicle. The actual status of the utility locking system can thus be determined using such temperature data.

It may be particularly preferred that there is a deviation of the actual status from the target status when

- the locking device is in the unbolted status, and
- a mobile terminal which has previously communicated with the electronic knob to unbolt the utility locking system, is moving or has moved away from the electronic knob, and in particular the mobile terminal moving away from the electronic knob is determined by a signal strength of the wireless connection and/or by location data and/or by acceleration data and/or speed data of the mobile terminal.

With these measures, for example, it is advantageously avoidable that the user inadvertently moves away from the electronic knob, which could lead to follow-up activities that would be costly (e.g. wasted time) and also not sustainable (e.g. fuel consumption). The acceleration data and/or speed data of the mobile terminal can be characteristic of a moving vehicle, for example, such that the acceleration data and/or speed data of the mobile terminal can be used to determine whether the mobile terminal is in a vehicle and is therefore moving away from the utility locking system.

It may be particularly preferred that the utility locking system includes information about whether the mobile terminal is located within a predefined spatial region, with a notification only being output if the actual status deviates from the target status if the mobile terminal is outside of the predefined spatial region.

By providing this function, it is avoided that a user receives a notification while, for example, maintenance work is being carried out at a designated location that is secured by the locking system. In other words: A user who carries the mobile terminal with them and moves in a predefined spatial region, for example in a room in which maintenance work has to be carried out by the user, does not receive a notification while they are in the predefined spatial region. This avoids the user being disturbed by unnecessary notifications while carrying out maintenance work, for example.

It is conceivable, for example, that the detection of the actual status shows that the utility locking system is in an unbolted status while the mobile terminal is moving relative to the electronic knob, with the associated target status requiring that the utility locking system should not be unbolted when the mobile terminal moves farther away. In such a case, a notification can be output, but the output of a notification can be subject to further rules using the definition of spatial regions. For example, it can be provided that no notification is output as long as the mobile terminal or the user is located in this predefined spatial region. As a result, an undesired output of a notification, for example for larger areas or buildings, in particular with a plurality of rooms, can be prevented. For example, it is conceivable that the locking device bolts an entrance to a building wing. After this access has been unbolted, a user can stay in the building wing with their mobile terminal for a long period of time, for example to carry out repairs or maintenance work in different rooms of this building wing. As long as the mobile terminal does not leave the defined spatial region, which at least comprises the building wing, the utility locking system has been intentionally left in the unbolted status. Advantageously, therefore, no notification is output.

It may be preferable for the target status to be dynamically adjusted depending on a time and/or depending on a period of time between points in time at which a locking status of the locking device is changed and/or depending on a period of time while the locking system is unbolted. It is conceivable, for example, that the target status is adjusted depending on a time, a day of the week or a date. It is conceivable, for example, that the target status is automatically adjusted in such manner that the locking device should generally be closed after a definable time, for example 5:00 p.m., such that every opening of the locking device after this definable time represents a deviation from this target status and leads to the output of a notification. Alternatively, it is conceivable, for example, that the locking device should be closed on a definable day of the week, for example on Sundays, such that each opening of the locking device on this definable day of the week represents a deviation from this target status and leads to the output of a notification. As a further example, it can be provided that the target status is adjusted depending on the weather, such that the utility locking system should not be unbolted when it rains. An advantageously high level of security can thus be achieved. For example, there can be a notification in the event of potentially unauthorized unbolting or unbolting attempts.

By providing this function, a target status can be defined for example for specific times, according to which the locking status of the locking device should be a bolted locking status. In this way, undesired locking statuses can be linked directly to the times of day or periods of time. An additional increase in the security and reliability of the locking system can be achieved as a result.

In particular, it can be provided that the at least one notification can be deactivated by a user command. It is thus possible for a user to deactivate a notification by means of a user command, for example by making an entry on the mobile terminal. This makes it particularly easy to adjust the output of notifications to the needs of the user.

It is within the meaning of the disclosure if a notification is also output if no deviation is detected.

The locking device can preferably be unbolted and bolted without interaction with the mobile terminal. This is in particular advantageous when

- the owner does not accept the use of the mobile terminal (e.g. in potentially explosive environments such as gas filling stations or gas pressure regulation systems)
- the owner does not accept the mobile terminal as part of the equipment that the user carries with them, which may be the case, for example, in research or innovation fields;
- the mobile network is down, whereby the user has access to an electronic master key (passepartout) at a specific location;
- the user needs immediate access in emergency situations, which can apply e.g. for emergency personnel of the fire department, who can obtain an electronic key, which is kept accessible in separate key cases close to the locking device in order to replace the mobile terminal.

Provision is preferably made for an electronic controller to be provided in the utility locking system, which compares the actual value with the target value. In particular, an electronic controller, which compares the actual value with the target value, is provided in the electronic knob and/or in the mobile terminal. The electronic controller can be designed to initiate the notification.

This avoids the user having to drive back to the site if they accidentally forgot something. This reduces wasted time and fuel, while avoiding a breach of service obligations. For example, the utility locking system could have been left in an unbolted status when the user was distracted for some reason and wanted to leave the location.

According to one embodiment of the present disclosure, it is conceivable that interactions between the mobile terminal and the electronic knob are tracked, preferably in a database on a server. It is conceivable that all interactions of the mobile terminal with the electronic knob are tracked or that only some of the interactions are tracked, in particular in such manner that definable types of interactions of the mobile terminal with the electronic knob are tracked. For example, the definable types of interactions that are tracked may include one, a plurality of, or all of the following types of interactions:

- unbolting the utility locking system using the mobile terminal,
- bolting locking devices using the mobile terminal,
- transmitting a force from the electronic knob to the locking device, in particular a translatory and/or rotary force, receiving and/or determining identification information of a utility locking system by way of the mobile terminal, preferably by means of communication between the electronic knob and the mobile terminal, receiving a wireless communication signal between the mobile terminal and the electronic knob, for example as part of a pairing.

According to one embodiment of the present disclosure, it is provided that a position determination, relating to a position of the utility locking system or the electronic knob, is carried out using a locating device, in particular a satellite navigation device, of the mobile terminal, with the position of the utility locking system or the electronic knob being equated to the position of the mobile terminal, in particular if the distance between the mobile terminal and that of the utility locking system or the electronic knob is below a threshold value, and with the position of the utility locking system or the electronic knob preferably being stored in a database, and/or that identification information of the utility locking system or the electronic knob is determined or obtained by the mobile terminal, with a position determination, relating to a position of the utility locking system or the electronic knob, being carried out using the identification information, and in particular using a database comparison.

It is conceivable, for example, that the identification information is stored (in particular as data) in the locking device and can be read out by the mobile terminal when interacting with the utility locking system or the electronic knob. It is also conceivable for the utility locking system to transmit the identification information, for example via a wireless communication interface, and for the mobile terminal to receive the transmitted identification information. Alternatively or additionally, it is conceivable, for example, for the utility locking system to have its identification information as optically readable and/or readable information, for example as a numeric code, QR code or barcode, with the identification information being detected by a corresponding detection device of the mobile terminal.

A connection between the identification information of the utility locking system and the position or the place of use and/or installation location of the utility locking system can be stored in a database, preferably on a server, with which the mobile terminal can communicate such that by way of a database query, a conclusion can be made from the Identification information about the position at which the mobile terminal was located when obtaining or determining the identification information. In this way, it is possible in a particularly advantageous manner to keep track of the locations at which the mobile terminal was located.

It is thus possible, for example, to determine inconsistencies between maintenance plans or repair plans and maintenance work or repair work actually carried out. Furthermore, it is thus possible to track in an efficient and automated manner the locations at which work has been carried out by the person without technical personnel having to keep laborious and manual lists for this purpose.

For example, it is conceivable for a number of locking devices to be arranged on a number of electrical boxes, with one or a plurality of people having to carry out work on each of these electrical boxes with their mobile terminals, for example inspection work or repair work on the electrical boxes. By means of the present disclosure, an automated position determination can be implemented such that it can be tracked in a database at which locations and thus at which electrical boxes the people have already been. It can thus be ensured and checked that no electrical box has been forgotten, and it can be avoided that individual electrical boxes are shut down several times. It is also possible to check whether the people have complied with a possibly specified sequence of maintenance work. In this way, errors and technical problems can be avoided. Furthermore, the expenditure of energy and the costs that would arise, for example, if an electrical box were to be shut down twice unnecessarily, can be reduced. Furthermore, it can be tracked and determined, for example, which electrical boxes were serviced/repaired particularly frequently such that systematic problems can be identified or potential faults caused by external influences can be determined in a targeted manner.

A number of different embodiments and positions are conceivable for the database. For example, it is conceivable that the database is arranged in a server system, for example as a cloud, or in the mobile terminal. It is conceivable that the electronic knob and/or the mobile terminal have a direct communication connection to the database or that the transmission of data between the electronic knob and/or the mobile terminal on the one hand and the database on the other hand takes place via intermediate stations or intermediate elements. In particular, it can be provided that the electronic knob communicates with the database through the mobile terminal, with the mobile terminal being used as a "gateway". It is conceivable that the database is a distributed database or a central database.

It is conceivable that, in particular by an owner of the utility locking system, a marker for mobile terminals can be stored in a database, with the marker preferably indicating that the mobile terminal is blocked and/or has been lost and/or has been stolen and/or is no longer used. Alternatively or additionally, it is conceivable for the mobile terminal to be able to be added to a blocking list (blacklist), in particular by an owner of the utility locking system. It is conceivable that a warning notification will be output if a mobile terminal marked in this way, which is on the blacklist, is used, for example to unbolt a utility locking system.

In a further aspect of the disclosure, an electronic knob for use in the aforementioned method is shown with a processor and a memory, with at least one sensor which is configured to determine an actual status of the utility locking system, and with an interface to wirelessly communicate with a mobile terminal.

The advantages mentioned above in relation to the corresponding configuration of the method are correspondingly associated with the electronic knob. In particular, the appropriately designed electronic knob can be used to carry out the method.

In particular, the electronic knob can have a sensor for determining a locking status of the locking device, and the locking status of the locking device can be an unbolted or bolted status. Furthermore, the electronic knob can have an energy storage device, in particular a battery.

The electronic knob can, for example, actuate the locking device of the utility locking system according to the coupling principle or according to the blocking principle. The person skilled in the art knows the respective functional principles.

In a further aspect of the disclosure, a utility locking environment for carrying out the method is shown, comprising an electronic knob and a utility locking device, with the utility locking environment comprising in particular a mobile terminal.

The advantages mentioned above in relation to the corresponding configuration of the method are correspondingly associated with the utility locking environment. In particular, an appropriately designed utility locking environment can be used to carry out the method.

In a further aspect of the disclosure, a computer program product is specified, comprising commands, which cause the electronic knob and/or the mobile terminal designed and configured to communicate with the electronic knob, and/or the utility locking environment, to carry out the above method.

BRIEF DESCRIPTION OF THE DRAWINGS

Further details and advantages of the disclosure will be explained below with reference to the embodiments shown in the figures. They show.

DETAILED DESCRIPTION OF THE DRAWINGS

Figure 1:
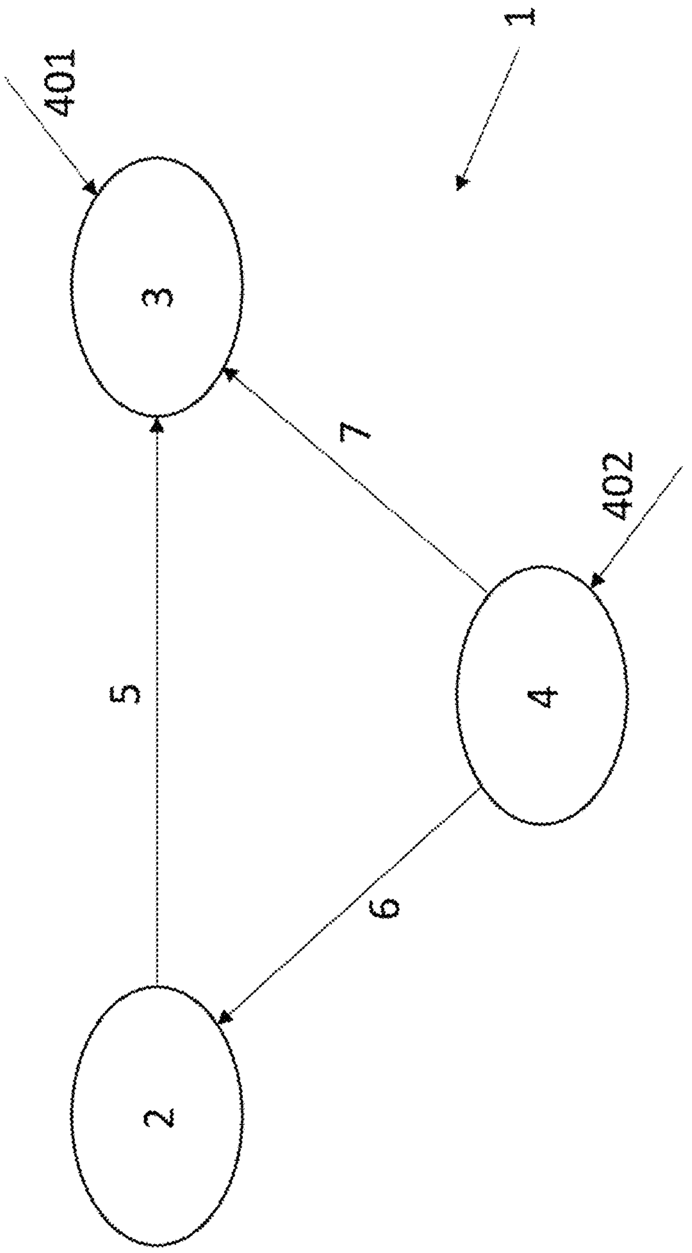
FIG. 1 a schematic representation of a utility locking system according to one embodiment of the disclosure, FIG. 2 a flow diagram of an embodiment of the method according to the disclosure, FIG. 3 a schematic representation of an electronic knob and of a locking device according to one embodiment of the present disclosure, FIG. 4 a schematic representation of an electronic knob and of a mobile terminal according to one embodiment of the present disclosure, and FIG. 5 a schematic representation of a plurality of distributed locking systems according to embodiments of the present disclosure.

The same parts are always provided with the same reference numerals in the different figures, which is why they are generally also only described once.

FIG. 1 shows a utility locking system 1 in a schematic representation. The utility locking system 1 has an electronic knob 2 and a locking device 3 which can be actuated with the electronic knob 2.

The utility locking system 1 is suitable for use on a building and/or on an access solution for a room in which equipment and/or devices to be maintained or checked are installed, which are also to be checked or inspected in compliance with certain time periods, which may be predefined as standard. In particular, the locking device 3 can be designed as a locking cylinder fora building door, a room door and/or for a furniture door, without the exemplary naming of such locking cylinders being intended to be restrictive. The locking device 3 can also be configured as a padlock, merely by way of example.

A torque may be transmittable, in particular can be transmitted, from the electronic knob 2 to the locking device 3 which is represented schematically using the connecting arrow 5.

According to the exemplary embodiment of FIG. 1, the utility locking system 1 also has a mobile terminal 4, which is designed e.g. as a mobile telephone. The mobile terminal is designed and configured to communicate with the electronic knob 2 and thus with the utility locking system 1, which is represented by the arrows 6 and 7.

Figure 2:
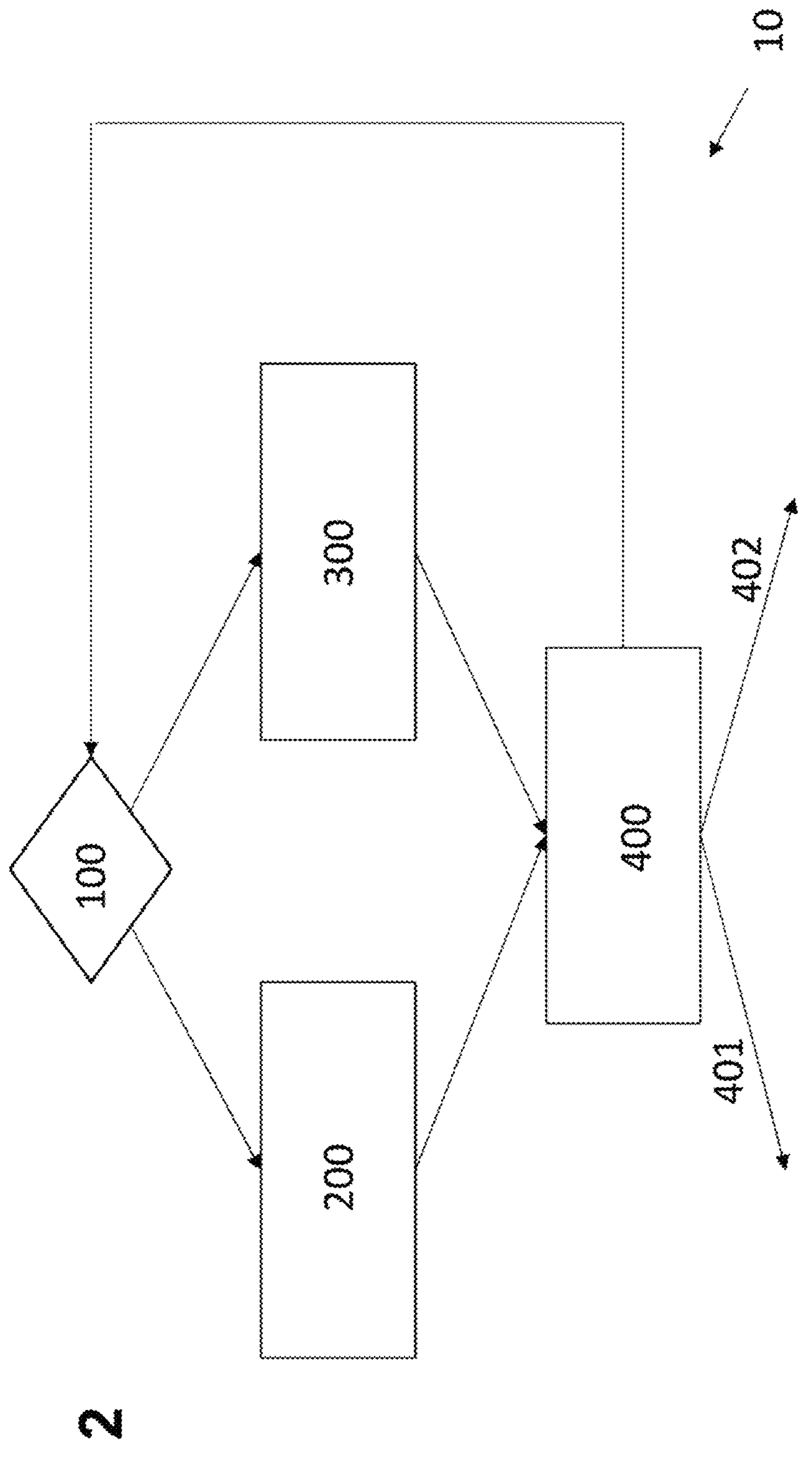

In FIG. 2, a flow diagram of a method 10 is indicated for outputting a notification about the existence of a status of the utility locking system 1 to be avoided, with the utility locking system 1 having the electronic knob 2 and the locking device 3 which can be actuated with the electronic knob 2, as well as, by way of example, the mobile terminal 4.

The method 10 comprises at least the steps:

Detecting an actual status of the utility locking system 1,

Determining a target status of the utility locking system 1 depending on predefined criteria, Comparing the actual status with the target status of the utility locking system 1 and determining whether there is a discrepancy between the actual status and the target status of the utility locking system 1, Outputting at least one notification if there is a discrepancy between the actual status and the target status of the utility locking system 1.

The method 10 begins in the start step 100, with the actual status of utility locking system 1 on the one hand being detected in step 200. In step 300, the target status of the utility locking system 1 is determined. Both statuses are supplied to the comparison step 400.

If a discrepancy is found, for example by comparing a target status and an actual status of the utility locking system, preferably by the mobile terminal, a notification, in particular a first notification 401, is output on the electronic knob 2, and/or a notification, in particular a second notification 402, is output on the mobile terminal 4.

Provision can be made for the actual status of the utility locking system 1 to comprise a determined characteristic value which is derived from signal characteristic values of the wireless communication between the electronic knob 2 and the mobile terminal 4. The target status may comprise a threshold characteristic value with which the actual status can be compared. In this embodiment, the determined characteristic value is a signal strength characteristic value and the threshold characteristic value is a signal strength threshold value.

The actual status of the locking system 1 can additionally or alternatively comprise a user status of a user of the mobile terminal 4. In this case, the user status can be detected on the basis of acceleration data and/or speed data and/or temperature data, which are recorded by means of sensors of the mobile terminal 4.

If no discrepancy is found, the start step 100 is returned to, with the method being repeated.

Figure 3:
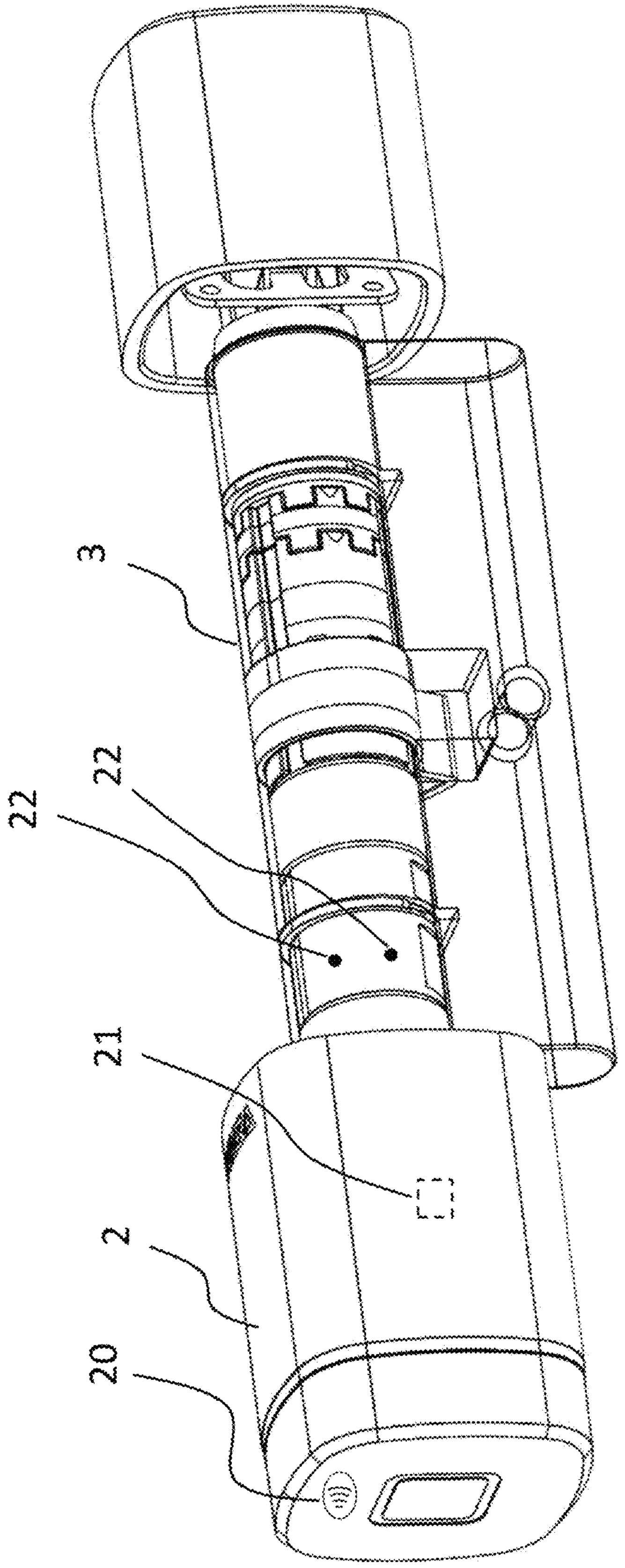

A schematic representation of an electronic knob 2 according to one embodiment of the present disclosure is shown in FIG. 3. The electronic knob 2 is connected to a locking device 3, in particular placed in a locking cylinder. The locking device 3, in particular the locking cylinder, is electromechanically bolted in a bolted status. The locking device can be unbolted using a manual rotation of the electronic knob 2 relative to the locking device 3. With a further rotation, the locking device 3 can be unbolted again. The electronic knob 2 can be designed according to the coupling principle or according to the blocking principle.

The electronic knob 2 has sensors 21, 22 which can monitor the actual status, in particular the locking status of the locking device 3. Furthermore, the electronic knob 2 has an interface 20 for wireless communication, in particular with a mobile terminal. An energy storage device, such as a battery, can be integrated into the electronic knob 2.

Figure 4:
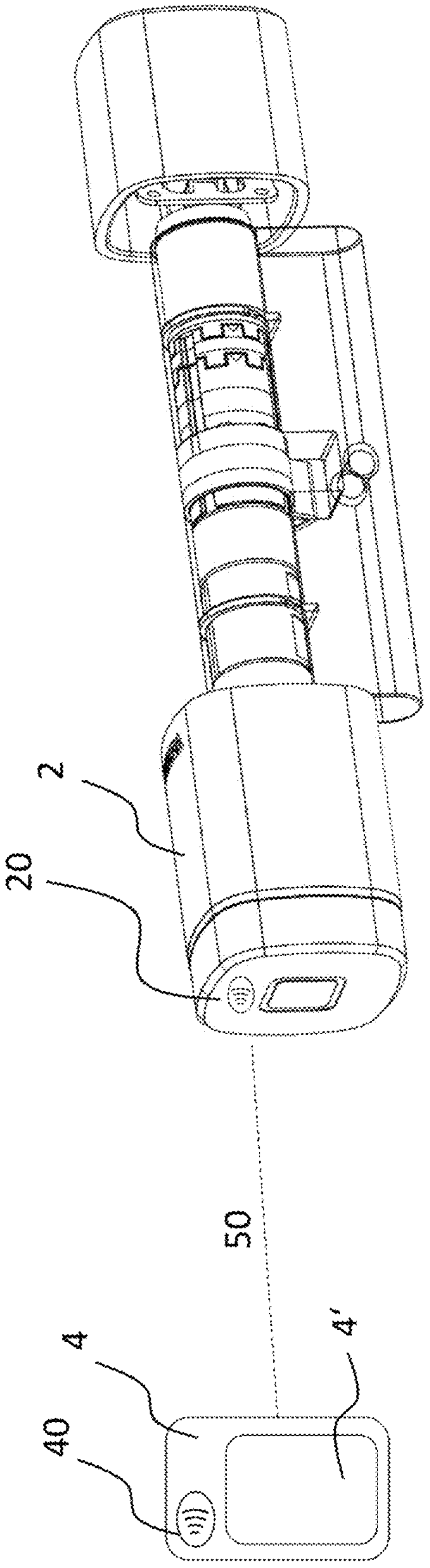

In FIG. 4, a schematic representation of an electronic knob 2 with a locking device 3 according to an embodiment of the present disclosure is shown, with the electronic knob 2 being designed for communication with a mobile terminal 4. In order to form a wireless communication connection 50 between the electronic knob 2 and the mobile terminal 4, the electronic knob 2 has an interface in particular a communication interface. The mobile terminal 4 also has a communication interface 40 for establishing the wireless communication connection 50. The wireless communication connection 50 can be formed using Bluetooth, for example. Other communication technologies and/or protocols are also possible.

It is conceivable that the actual status of the locking system 1 comprises a determined characteristic value which is derived from signal characteristic values of wireless communication between the electronic knob 2 and the mobile terminal 4 using the wireless communication connection 50. In this case, the target status preferably comprises a threshold characteristic value for comparison with the determined characteristic value.

In a comparison of the actual status with the target status of the utility locking system 1, it can thus be determined whether there is a discrepancy between the actual status and the target status of the utility locking system 1 in such manner that the determined characteristic value, which is derived from signal characteristic values of the wireless communication between the electronic knob 2 and the mobile terminal 4 using the wireless communication connection 50, meets or does not meet a target status or a target criterion, which comprises the threshold characteristic value or is based thereon. At least one notification is output depending on this comparison, in particular when there is a discrepancy between the actual status and the target status of the utility locking system 1.

It is possible, for example, for the at least one notification to be output if the comparison between the determined characteristic value and the threshold characteristic value shows that the signal strength of the wireless communication connection is below a definable threshold and/or falls below a definable threshold and the utility locking device 1 is unbolted. From this, it can be concluded in a number of situations that the mobile terminal 4 is moving away from the utility locking device 1 and it has been forgotten to bolt the utility locking device 1.

The electronic knob 2 preferably comprises a device for outputting a first notification, for example a loudspeaker, a signal lamp and/or a screen.

The mobile terminal 4 preferably has a playback device 4', in particular a screen, which is configured to output and/or display a second notification. As an alternative or in addition to a screen, the mobile terminal 4 can also comprise a loudspeaker for outputting a second notification, for example.

Furthermore, sensors 21, 22 of the electronic knob 2, represented schematically, are shown in FIG. 4. In this embodiment, the locking status of the locking device 3 or of the utility locking system 1 can be determined by means of data of the sensors 21, 22. The sensors 21, 22 can be arranged at least partially in the electronic knob 2 and/or in the locking device 3.

The sensor 21 can be an acceleration sensor 21 or a gyroscope 21. The reference numeral 21 is therefore also used below for the terms "acceleration sensor" and "gyroscope". The sensor 22 is, for example, an arrangement of pressure sensors 22, with at least two pressure sensors 22 preferably being provided in order to detect the transmission of a torque to a lock when bolting and unbolting. The reference numeral 22 is therefore also used below for the term "pressure sensor". The accuracy of the detection can be increased by providing more than two pressure sensors 21, for example two on each side.

By recording and processing sensor data of the sensors 21, 22, it can be ensured that the respective locking status can be generated in its actual status at any time. Using an acceleration sensor 21, gyroscope 21 and/or pressure sensor 22 of the electronic knob 2, the locking status of the locking device 3 or of the locking system 1 can thus advantageously be determined.

The use of an acceleration sensor 21 is advantageous with regard to its particularly low power consumption, but also with regard to its inexpensive procurement. The use of a gyroscope 21 is advantageous with regard to its high accuracy. The use of pressure sensors 22 is advantageous with regard to the particularly simple derivation of the locking status and the simple structural design. A particularly simple arrangement of the pressure sensors 22 can be inferred from FIG. 4. Here the pressure sensors 22 are arranged at points of the electronic knob 2 which allow a direction of rotation of the electronic knob 2 to be detected when a torque is transmitted to the locking device 3 and the locking status of the locking system 1 to be derived therefrom.

In particular, provision can be made for the locking system 1 to comprise information about whether the mobile terminal 4, which has a wireless communication connection to the electronic knob 2, is located within a predefined spatial region. If the actual status deviates from the target status, it can be provided that a notification is only output if the mobile terminal 4 is located outside of the predefined spatial region.

This function prevents a user from receiving a notification while, for example, maintenance work is being carried out at a designated location that is secured by the locking system 1. In other words: A user who carries the mobile terminal 4 with them and is moving in a predefined spatial region, for example in a room in which maintenance work has to be carried out by the user, does not receive a notification while they are in the predefined spatial region. This avoids the user being disturbed by unnecessary notifications while carrying out maintenance work, for example. Furthermore, false alarms are avoided.

Provision can also be made for the target status to be dynamically changeable depending on a time and/or depending on a period of time between points in time at which a locking status of the locking device 3 is changed.

By providing this function, a target status can be defined for example for specific times, according to which the locking status of the locking device 3 should be a bolted locking status. In this way, undesired locking statuses can be linked directly to the times of day or periods of time. An additional increase in the security and reliability of the locking system can be achieved as a result.

Figure 5:
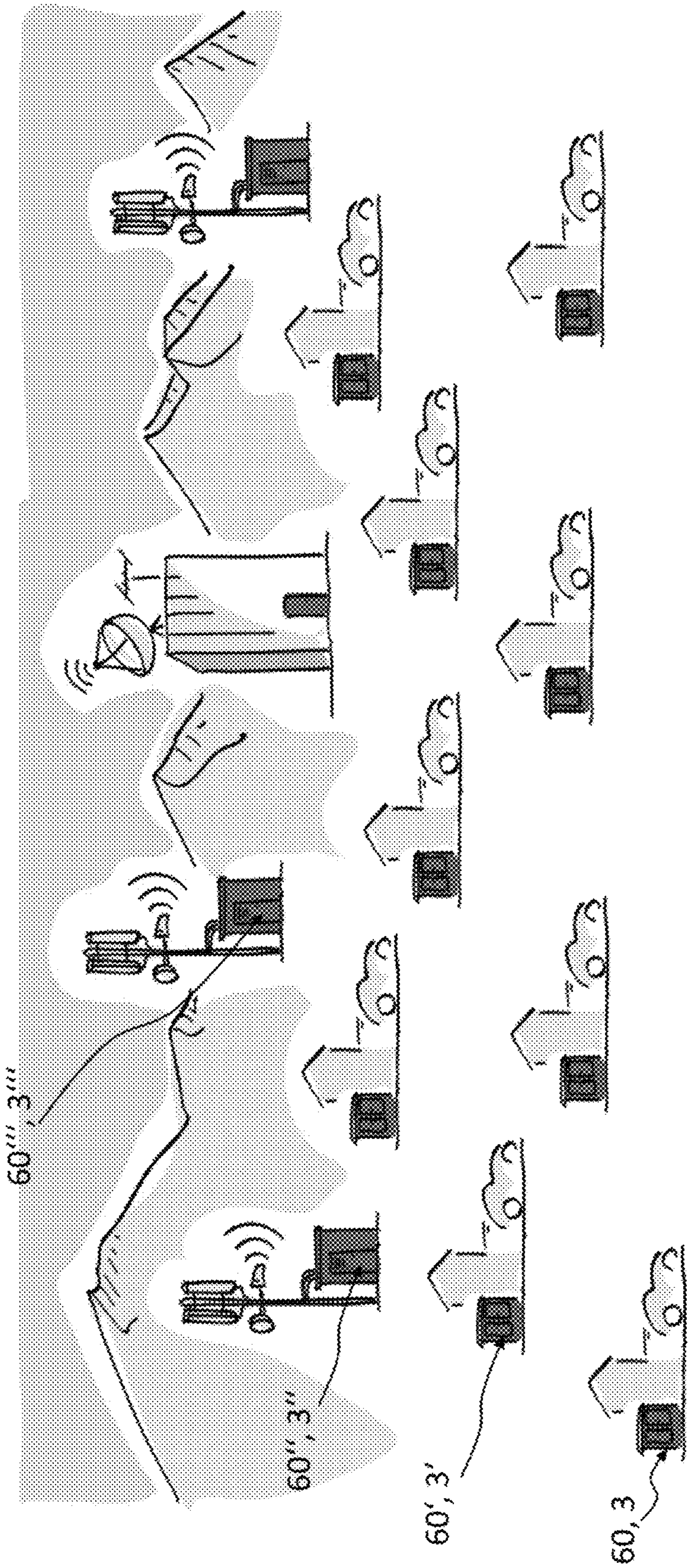

In FIG. 5, a plurality of distributed locking systems according to embodiments of the present disclosure is shown. A number of buildings and/or devices are present, each of which can be closed by a door 60, 60', 60", 60'". The buildings and/or devices may be in different locations. It is conceivable, for example, for technical maintenance work and/or repair work to be carried out in the buildings and/or on the devices. The doors 60, 60', 60", 60" are each secured using locking devices 3, 3', 3", 3'". An electronic knob 2 is configured and set up to open the locking devices 3, 3', 3", 3'". The electronic knob 2 is carried along, for example, by a person who carries out the maintenance work and/or repair work.

The locking devices 3, 3', 3", 3'" preferably each have identification information which uniquely identifies the locking devices 3, 3', 3", 3'" in each case. This identification information is read out and/or received by a mobile terminal 4. By keeping track of the identification information in a database, it can thus be determined where the mobile terminal 4 was located or which locking devices 3, 3', 3", 3" were shut down. Time information relating to the time at which the electronic knob 2 interacted with the corresponding locking device 3, 3', 3", 3" is preferably also recorded.

The method according to the disclosure can be carried out with the embodiments of the present disclosure represented in the figures.

The invention claimed is:

1. A method for outputting a notification about the existence of a status of a utility locking system to be avoided, wherein the utility locking system comprises an electronic knob and a locking device which can be actuated with the electronic knob, wherein a force may be transmittable or is transmitted manually from the electronic knob to the locking device in order to transfer the utility locking system from a bolted to an unbolted status and/or from an unbolted status to a bolted status, having the steps:

Detecting an actual status of the utility locking system,

Determining a target status of the utility locking system depending on predefined criteria, Comparing the actual status with the target status of the utility locking system and determining whether there is a discrepancy between the actual status and the target status of the utility locking system, Outputting at least one notification if there is a discrepancy between the actual status and the target status of the utility locking system, wherein the utility locking system comprises information about whether a mobile terminal, which is configured to communicate with the electronic knob and/or with the locking device, is located within a predefined spatial region, wherein if there is a deviation of the actual status from the target status, a notification is only output if the mobile terminal is located outside of the predefined spatial region.

2. The method according to claim 1, wherein the electronic knob is electrically and/or mechanically coupled to the locking device, and wherein the electronic knob is electrically and/or mechanically detachable from the locking device in a non-destructive manner.

3. The method according to claim 1, wherein the electronic knob and a mobile terminal are configured to communicate with one another wirelessly and to transmit at least access authorizations and/or opening commands and/or position data.

4. The method according to claim 1, wherein the force that is transmitted from the electronic knob to the locking device in order to transfer the utility locking system from a bolted to an unbolted status and/or from an unbolted status to a bolted status is accompanied by a translatory and/or rotary movement of the electronic knob relative to the locking device carried out manually by a user, wherein the force is a torque.

5. The method according to claim 1, whereinwhen the at least one notification is output, a first, notification is output on the electronic knob, wherein the notification is an acoustic and/or haptic and/or visual notification.

6. The method according to claim 1, whereinwhen the at least one notification is output, a second, notification is output on a mobile terminal, wherein the mobile terminal is designed and configured to communicate with the utility locking system, the electronic knob and/or with the locking device, wherein the notification is an acoustic and/or haptic and/or visual notification.

7. The method according to claim 1, wherein the actual status of the utility locking system comprises an unbolted and a bolted status, wherein the locking status of the utility locking system is determined by data of at least one sensor arranged in or on the electronic knob, wherein the at least one sensor is selected from the following sensor types: Acceleration sensor, gyroscope, and pressure sensor.

8. The method according to claim 1, whereinthe actual status of the utility locking system comprises a determined characteristic value which is derived from signal characteristic values of wireless communication between the electronic knob and a mobile terminal, wherein a distance between the mobile terminal and the electronic knob can be derived from the signal characteristic values of the wireless communication, and wherein the target status comprises a threshold characteristic value, and wherein the determined characteristic value is a signal strength characteristic value and the threshold characteristic value is a signal strength threshold value.

9. The method according to claim 1, whereinthe actual status of the utility locking system comprises a user status of a user of a mobile terminal, which is designed and configured to communicate wirelessly with the electronic knob and/or with the locking device, wherein the user status is detected on the basis of acceleration data and/or speed data and/or temperature data, wherein the acceleration data and/or speed data and/or temperature data are recorded by means of sensors of the mobile terminal.

10. The method according to claim 1, whereinthere is a deviation of the actual status from the target status when the locking device is in the unbolted status, and a mobile terminal, which has previously communicated with the electronic knob to unbolt the utility locking system, is moving or has moved away from the electronic knob, wherein the mobile terminal moving away from the electronic knob is determined by a signal strength of the wireless connection and/or by location data and/or by acceleration data and/or speed data of the mobile terminal.

11. The method according to claim 1, whereby dynamically adjusting the target status depending on a time and/or depending on a period of time between points in time at which a locking status of the locking device is changed and/or depending on a period of time after the electronic knob has been actuated.

12. The method according to claim 1, wherein a position determination, relating to a position of the utility locking system or the electronic knob, is carried out using a locating device, of the mobile terminal, wherein the position of the utility locking system or the electronic knob is equated to the position of the mobile terminal, if the distance between the mobile terminal and that of the utility locking system or the electronic knob is below a threshold value, and wherein the position of the utility locking system or the electronic knob is stored in a database, and/or in that identification information of the utility locking system or the electronic knob is determined or obtained by the mobile terminal, wherein a position determination, relating to a position of the utility locking system or the electronic knob, is carried out using the identification information, and using a database comparison.

13. An electronic knob as a component of a utility locking system for use in a method according to claim 1 with:

a processor, a memory, at least one sensor that is configured to determine an actual status of the utility locking system, and an interface for wireless communication with a mobile terminal.

14. A utility locking environment for carrying out the method according to claim 1, comprising an electronic knob having a processor, a memory, at least one sensor configured to determine an actual status of the utility locking system, and an interface for wireless communication with a mobile terminal, and a locking device, wherein the utility locking environment comprises a mobile terminal.

15. A computer program comprising commands, which cause an electronic knob having a processor, a memory, at least one sensor configured to determine an actual status of the utility locking system, and an interface for wireless communication with a mobile terminal, and/or a mobile terminal designed and configured to communicate with the electronic knob, and/or a utility locking environment for carrying out the method according to claim 1.

* * * * *